United States Patent
Zhang et al.

(10) Patent No.: US 10,243,600 B2
(45) Date of Patent: Mar. 26, 2019

(54) RECEIVER AND WIRELESS COMMUNICATIONS APPARATUS

(71) Applicant: HUAWEI TECHNOLOGIES CO., LTD., Shenzhen, Guangdong (CN)

(72) Inventors: Cheng Zhang, Shanghai (CN); Jinming Wang, Shanghai (CN); Chen Wang, Shanghai (CN); Bingxin Li, Kista (SE)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/690,860

(22) Filed: Aug. 30, 2017

(65) Prior Publication Data
US 2018/0062681 A1    Mar. 1, 2018

(30) Foreign Application Priority Data
Aug. 31, 2016   (CN) ........................ 2016 1 0793839

(51) Int. Cl.
*H04B 17/20*   (2015.01)
*H04B 1/10*    (2006.01)
(Continued)

(52) U.S. Cl.
CPC ............. *H04B 1/1027* (2013.01); *H04B 1/06* (2013.01); *H04B 1/10* (2013.01); *H04B 1/18* (2013.01); *H04B 1/30* (2013.01); *H04B 17/336* (2015.01)

(58) Field of Classification Search
CPC ........ H04B 17/00; H04B 17/20; H04B 17/21; H04B 17/29; H04B 17/30
See application file for complete search history.

(56) References Cited

U.S. PATENT DOCUMENTS

2003/0124999 A1   7/2003 Parssinen et al.
2004/0198286 A1  10/2004 Khorram
(Continued)

FOREIGN PATENT DOCUMENTS

CN   1437322 A    8/2003
CN   101789805 A  7/2010
(Continued)

OTHER PUBLICATIONS

Extended European Search Report dated Jan. 19, 2018 in corresponding European Patent Application No. 17188581.7, 8 pp.
(Continued)

*Primary Examiner* — Blane J Jackson
(74) *Attorney, Agent, or Firm* — Staas & Halsey LLP

(57) ABSTRACT

Embodiments of the present invention provide a receiver and a wireless communications apparatus. The receiver includes: an attenuation circuit, configured to receive an input signal, and obtain a first signal according to the input signal; a low-noise amplification circuit, configured to receive the first signal, and obtain a second signal according to the first signal; an orthogonal down-frequency conversion circuit, configured to receive the second signal, and process the second signal to obtain an output signal; and a control circuit, configured to separately control the attenuation circuit and the low-noise amplification circuit according to power of an interference signal included in the output signal, so as to determine whether the attenuation circuit attenuates the input signal and whether the low-noise amplification circuit amplifies the first signal.

22 Claims, 7 Drawing Sheets

(51) Int. Cl.
      *H04B 17/336*    (2015.01)
      *H04B 1/18*    (2006.01)
      *H04B 1/06*    (2006.01)
      *H04B 1/30*    (2006.01)

(56) References Cited

U.S. PATENT DOCUMENTS

2011/0204973 A1    8/2011    Hu et al.
2012/0329415 A1\*  12/2012  Ruijter ................ H04B 1/1027
                                                    455/226.2
2015/0111514 A1    4/2015    Harwalkar et al.

FOREIGN PATENT DOCUMENTS

| | | | | |
|---|---|---|---|---|
| CN | 102324946 A | * | 1/2012 | ............... H04B 1/16 |
| CN | 102932021 A | | 2/2013 | |
| CN | 103580704 A | | 2/2014 | |
| EP | 1 503 517 A2 | | 2/2005 | |
| EP | 1503517 A2 | * | 2/2005 | ............. H04B 7/005 |
| EP | 1 040 586 B1 | | 11/2005 | |
| EP | 2 899 891 A1 | | 7/2015 | |
| JP | 0H0116061 B2 | * | 3/1989 | ................ H03J 5/24 |

OTHER PUBLICATIONS

Chinese Office Action dated Apr. 4, 2018, in corresponding Chinese Patent Application No. 201610793839.4, 9 pgs.

\* cited by examiner

RECEIVER AND WIRELESS COMMUNICATIONS APPARATUS

CROSS-REFERENCE TO RELATED APPLICATION

This application claims priority to Chinese Patent Application No. 201610793839.4, filed on Aug. 31, 2016, which is hereby incorporated by reference in its entirety.

TECHNICAL FIELD

The present invention relates to the communications field, and more specifically, to a receiver and a wireless communications apparatus in the communications field.

BACKGROUND

Indoor coverage and outdoor hotspot coverage will become main requirements of wireless network coverage in the 5G era. In this case, a small cell and massive multiple input multiple output (Massive MIMO) will become main solutions. Both the small cell and a massive MIMO product use a Radio on Chip (ROC) chip to receive and send signals.

On one hand, among performance indicators of a wireless base station, static sensitivity is an important parameter for ensuring network coverage, and the ROC chip needs to reduce noise of a receive link. On the other hand, with a growing quantity of access users, an interference scenario is becoming more complex, and a specific receiving signal-to-noise ratio of the receive link needs to be ensured in a strong blocking scenario.

However, a receive link of a current ROC chip has a relatively small dynamic range, and cannot take into account static sensitivity at a weak blocker and blocker sensitivity at medium and strong blockers. In addition, to optimize the static sensitivity at the weak blocker, an LNA with a high linearity requirement and high power consumption needs to be added before the chip to optimize noise, and this requires relatively high costs.

SUMMARY

Embodiments of the present invention provide a receiver and a wireless communications apparatus, so as to meet requirements of the receiver for noise and linearity in different scenarios.

According to a first aspect, an embodiment of the present invention provides a receiver, where the receiver includes an attenuation circuit, a low-noise amplification circuit, an orthogonal down-frequency conversion circuit, and a control circuit, an output end of the attenuation circuit is coupled to an input end of the low-noise amplification circuit, an output end of the low-noise amplification circuit is coupled to an input end of the orthogonal down-frequency conversion circuit, and the control circuit is separately coupled to the low noise amplification circuit and the attenuation circuit, where the attenuation circuit is configured to receive an input signal, and obtain a first signal according to the input signal, where the first signal is the input signal or an attenuated signal obtained after the input signal is attenuated;

the low-noise amplification circuit is configured to receive the first signal, and obtain a second signal according to the first signal, where the second signal is the first signal or an amplified signal obtained after low-noise amplification processing is performed on the first signal;

the orthogonal down-frequency conversion circuit is configured to receive the second signal, and process the second signal to obtain an output signal; and the control circuit is configured to separately control the attenuation circuit and the low-noise amplification circuit according to power of an interference signal included in the output signal, so as to determine whether the attenuation circuit attenuates the input signal and whether the low-noise amplification circuit amplifies the first signal.

In this way, in this embodiment of the present invention, blocker signals (that is, the interference signal) of different power values correspond to different blocking scenarios, and the control circuit may enable the receiver to work in different working modes according to the different blocking scenarios, so as to meet requirements of the receiver system for noise and linearity in the different scenarios. Specifically, when the receiver is in a first working mode, the attenuation circuit does not attenuate the input signal, and the low-noise amplification circuit amplifies the first signal. When the receiver is in a second working mode, the attenuation circuit attenuates the input signal, and the low-noise amplification circuit amplifies the first signal. When the receiver is in a third working mode, the attenuation circuit attenuates the input signal, and the low-noise amplification circuit does not amplify the first signal.

Specifically, when the receiver works in the first working mode, noise of a link may be effectively suppressed to improve static sensitivity. When the receiver works in the second working mode, a better balance is achieved between the noise and the linearity to ensure that an overall SNDR is optimal. When the receiver works in the third working mode, linearity of a receive channel may be further improved to meet a demodulation requirement in an extreme scenario.

In addition, when the receiver works in the second working mode, an LNA is disposed behind a DSA. Requirements for the linearity and power consumption of the LNA can be reduced when the noise is optimized, that is, the LNA in the receiver in this embodiment of the present invention does not need to receive an excessively strong signal. Therefore, a requirement for the linearity is low, and low power consumption is required. This facilitates on-chip integration and further reduces layout and costs of link devices.

Optionally, the control circuit is specifically configured to:

when the power of the interference signal is less than preset first switching power, control the attenuation circuit not to attenuate the input signal, and control the low-noise amplification circuit to amplify the first signal; or when the power of the interference signal is greater than or equal to the first switching power and is less than preset second switching power, control the attenuation circuit to attenuate the input signal, and control the low-noise amplification circuit to amplify the first signal, where the second switching power is greater than the first switching power; or when the power of the interference signal is greater than or equal to the second switching power, control the attenuation circuit to attenuate the input signal, and control the low-noise amplification circuit not to amplify the first signal.

Optionally, the attenuation circuit includes the digital control attenuator DSA and a first switch that are connected in parallel; the low-noise amplification circuit includes the low noise amplifier LNA and a second switch that are connected in parallel; and the control circuit is specifically configured to control the first switch and the second switch, so as to determine whether the attenuation circuit attenuates the input signal and whether the low-noise amplification circuit amplifies the first signal.

Specifically, the control circuit may control, according to the power of the interference signal, the first switch to be closed and the second switch to be opened, where the DSA does not attenuate the input signal and the LNA amplifies the first signal when the first switch is closed and the second switch is open; or the control circuit controls, according to the power of the interference signal, the first switch to be opened and the second switch to be opened, where the RFDSA attenuates the input signal and the LNA amplifies the first signal when the first switch is open and the second switch is open; or the control circuit controls, according to the power of the interference signal, the first switch to be opened and the second switch to be closed, where the RFDSA attenuates the input signal and the LNA does not amplify the first signal when the first switch is open and the second switch is closed.

Optionally, the control circuit is specifically configured to: when the receiver switches from a working mode in which the first switch is open and the second switch is open to a working mode in which the first switch is open and the second switch is closed, update an attenuation value of the DSA to a difference between an attenuation value of the DSA in the working mode in which the first switch is open and the second switch is open and a gain value of the LNA in the working mode in which the first switch is open and the second switch is open.

For example, when switching is performed at a second earlier switching point, the attenuation value of the RFDSA is equal to the gain value of the LNA. In this case, the RFDSA may be switched to no attenuation, that is, the attenuation value of the RFDSA is switched to 0 dB, and the LNA may be switched to a pass-through state, so as to keep a gain of a system unchanged. For another example, when switching is performed at a second later switching point, the attenuation value of the RFDSA is greater than the gain value of the LNA. In this case, the attenuation value of the RFDSA may be switched to the difference between the attenuation value and the gain value, and the LNA may be switched to the pass-through state, so as to keep the gain of the system unchanged. Herein, the attenuation value of the DSA is a value by which the DSA attenuates the input signal, and the gain value of the LNA is a value by which the LNA amplifies the input first signal.

Optionally, the control circuit is further configured to determine the first switching power or the second switching power. Alternatively, the first switching power and the second switching power may be preconfigured in the control circuit.

Optionally, when the attenuation circuit does not attenuate the input signal and the low-noise amplification circuit amplifies the first signal, the control circuit is specifically configured to: determine a third-order nonlinear component IMD3 at an input end of the receiver according to the blocker signal; and use a power value of the blocker signal corresponding to the IMD3 as the first switching power when the IMD3 is equal to noise at the input end of the receiver.

In this case, that is, in the first working mode, $IMD3_s$ of the system may be represented as:

$$IMD3_s = 3P\text{blocker} - 2IIP3x \quad (2)$$

Noise $Nfloor_s$ of the system may be represented as:

$$Nfloor_s = Nfloorx \quad (3)$$

An SNDR of the system may be represented as:

$$SNDR = P\text{signal} - 10\log(10^{((3P\text{blocker}-2IIP3x)/10)} + 10^{((Nfloorx)/10)}) \quad (4)$$

Psignal represents a wanted signal component included in the output signal, Pblocker represents the interference signal. IIP3x represents an input third-order intercept point at an input end of the LNA, and Nfloorx represents a noise floor at the input end of the LNA.

When the blocker signal gradually becomes stronger, the IMD3 of the system increases. When the IMD3 of the system is equal to the noise of the system, the control circuit may control the RFDSA to attenuate the input signal, and control the LNA to amplify the signal output by the RFDSA.

Optionally, when the attenuation circuit does not attenuate the input signal and the low-noise amplification circuit amplifies the first signal, the control circuit is specifically configured to: determine a first SNDR of the receiver according to the blocker signal; and use a power value of the blocker signal corresponding to the first SNDR as the first switching power when the first SNDR is equal to an $SNDR_{min}$.

As the blocker signal becomes stronger, the IMD3 of the system increases, and in this case, the SNDR of the system decreases gradually. When the input signal becomes so strong that the SNDR of the system is equal to the $SNDR_{min}$, the control circuit may control the RFDSA to attenuate the input signal, and control the LNA to amplify the signal output by the RFDSA.

Optionally, when the attenuation circuit attenuates the input signal and the low-noise amplification circuit amplifies the first signal, the control circuit is specifically configured to: determine a first attenuation value of the DSA according to the gain value of the LNA; and determine a power value of the interference signal corresponding to the first attenuation value as the second switching power, where the attenuation value of the DSA is positively correlated with the power value of the interference signal.

In this case, that is, in the second working mode, $IMD3_m$ of the system may be represented as:

$$IMD3_m = 3P\text{blocker} - 2IIP3x - 2att \quad (6)$$

Noise $Nfloor_m$ of the system may be represented as:

$$Nfloor_m = Nfloorx + att \quad (7)$$

The SNDR of the system may be represented as:

$$SNDR = P\text{signal} - 10\log(10^{((3P\text{blocker}-2IIP3x-2att)/10)} + 10^{((Nfloorx+att)/10)}) \quad (8)$$

att represents the attenuation value of the attenuator.

After the control circuit performs the foregoing switching according to the first switching power, the attenuation value att of the RFDSA gradually increases as the blocker signal becomes stronger. When the attenuation value of the RFDSA is equal to the gain of the LNA, the power may be selected as the second switching power. In this case, the LNA is bypassed, and the attenuation of the RFDSA is restored to 0.

Optionally, when the attenuation circuit attenuates the input signal and the low-noise amplification circuit amplifies the first signal, the control circuit is specifically configured to: determine a second SNDR of the receiver according to the blocker signal; and use a power value of the blocker signal corresponding to the second SNDR as the second switching power when the second SNDR is equal to the $SNDR_{min}$.

After the control circuit performs the foregoing switching according to the second switching power, the SNDR of the system gradually decreases as the IMD3 of the system increases. When the input signal becomes so strong that the SNDR of the system is equal to the $SNDR_{min}$, the control circuit may control only the RFDSA to attenuate the input signal. In this case, a nonlinear component of the RFDSA gradually becomes a main component that affects the SNDR.

It should be noted that in this embodiment of the present invention, when the control circuit performs the switching according to the first switching power or the second switching power, the following formula needs to be met:

$$P\text{blocker} + \text{Gain}lna + \text{Gain}demod + \text{Gain}lpf < FSadc - \text{backoff} \quad (5)$$

Gainlna represents the gain of the LNA, Gaindemod represents a gain of a DEMOD, Gainlpf represents a gain of an LPF, FSadc represents a full scale of an analog-to-digital convener (ADC), backoff is a reduction value, and FSadc and backoff are determined according to a device feature. That is, when the switching is performed, after a blocker is amplified by the LNA, the DEMOD, and the LPF, output power is less than a value obtained after a reliable value backoff is subtracted from the full scale of the ADC. This ensures that a signal does not distort in the ADC.

Optionally, the orthogonal down-frequency conversion circuit includes a low-pass filter LPF; the control circuit is coupled to the LPF; and the control circuit is further configured to: control the LPF to attenuate, according to a preset first attenuation value, a signal that is input to the LPF, or control the LPF to attenuate, according to the first attenuation value, the signal that is input to the LPF, and control the DSA to attenuate the input signal according to a preset second attenuation value.

In this embodiment of the present invention, attenuating the input signal by the LPF or the DSA according to respectively preset attenuation values is referred to as pre-attenuation. When only an intermediate frequency LPF is used for preattenuation, because preattenuation does not need to be performed on the RFDSA, a noise factor NF of circuit input does not significantly increase, so that a noise floor after a system cascade can be less than that in the prior art. In addition, when preattenuation is performed only on the intermediate frequency LPF, a dynamic requirement on attenuation by the RFDSA is reduced, so that RFDSA design difficulty can be reduced; further, preattenuation is adjusted only at a circuit manufacturing stage and is not adjusted in use after delivery. Therefore, independent preattenuation is more convenient in a control solution, and is not performed when a used RFDSA performs adjustment.

In a radio frequency circuit, temperature compensation may also be performed in an analog domain. Different from batch compensation and frequency compensation, the temperature compensation needs to be performed with the AGC, and in this case, intermediate frequency attenuation and radio frequency attenuation may be combined for use.

According to a second aspect, an embodiment of the present invention provides a wireless communications apparatus, where the wireless communications apparatus includes the receiver in the first aspect or any possible implementation of the first aspect and an antenna, and the antenna is configured to receive an input signal and transmit the input signal to the receiver.

BRIEF DESCRIPTION OF DRAWINGS

To describe the technical solutions in the embodiments of the present invention more clearly, the following briefly describes the accompanying drawings required for describing the embodiments of the present invention. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are a part rather than all of the embodiments of the present invention. All other embodiments obtained by a person of ordinary skill in the art based on the embodiments of the present invention without creative efforts shall fall within the protection scope of the present invention.

Figure 1:
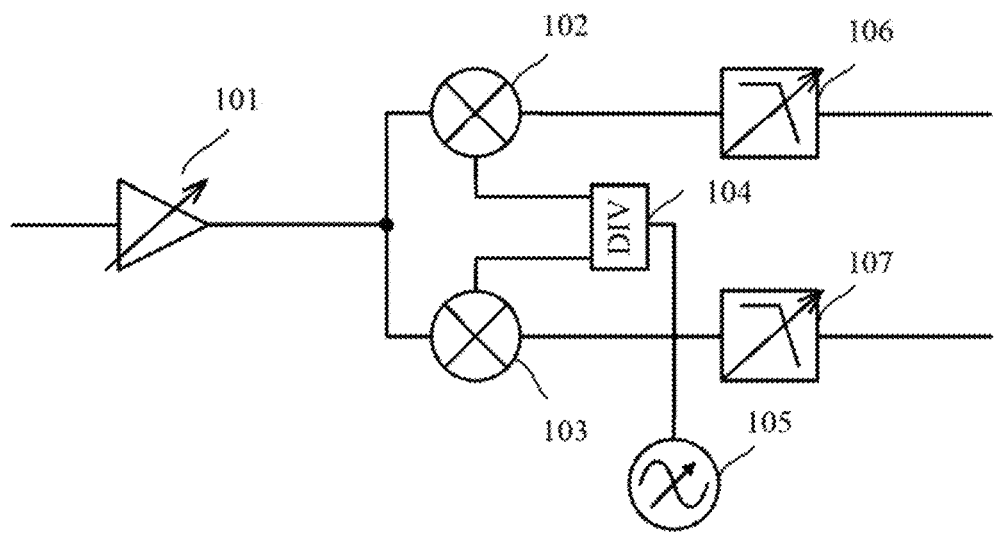
FIG. 1 shows a schematic structural diagram of a receiver according to an embodiment of the present invention.

FIG. 1 shows a schematic diagram of an architecture of a receiver used in a radio frequency module of a base station. The receiver includes a low noise amplifier 101 (LNA) with a variable gain, a demodulator (DEMOD) 102, a demodulator 103, a divider (DIV) 104, a phase locked loop 105 (PLL), a low-pass filter (LPF) 106, and a low-pass filter 107. A module that includes the DEMOD 102, the DEMOD 103, the DIV 104, the PLL 105, the LPF 106, and the LPF 107 may be referred to as an orthogonal down-frequency converter or an orthogonal down-frequency conversion circuit.

The LNA 101 is configured to perform low-noise amplification on an input signal. The LNA has low input noise and a high gain, and may suppress noise of a next circuit. A noise factor may be represented as NF. The PPL 105 is configured to implement a stable and high-frequency clock signal. The DIV 104 generates two orthogonal local-frequency signals according to the clock signal output by the PLL, and the two orthogonal local-frequency signals are separately input to the DEMOD 102 and the DEMOD 103. The DEMOD 102 and the DEMOD 103 respectively perform multiplication on the input signal and the orthogonal local-frequency signal generated by the DIV, so as to obtain two orthogonal output signals. The DEMOD 102 is connected to the LPF 106, and the DEMOD 103 is connected to the LPF 107. The LPF is configured to filter a signal output by a DEMOD to avoid aliasing of signals that are sampled by an analog-to-digital converter (ADC), and amplify the signals to suppress noise of the ADC. The LPF 106 and the LPF 107 in FIG. 1 may have variable gains.

When a small cell solution uses the receiver architecture shown in FIG. 1, there is one LNA outside a chip; temperature compensation, batch compensation, and automatic gain control (AGC) of a receive link are jointly completed by an intermediate frequency circuit and a radio frequency circuit, and frequency compensation is completed in a digital domain. When a blocker or a signal gradually becomes stronger, the receive link reduces gains gradually, starting from the intermediate frequency circuit and finally to the radio frequency circuit, according to a power value of the input signal.

Figure 2:
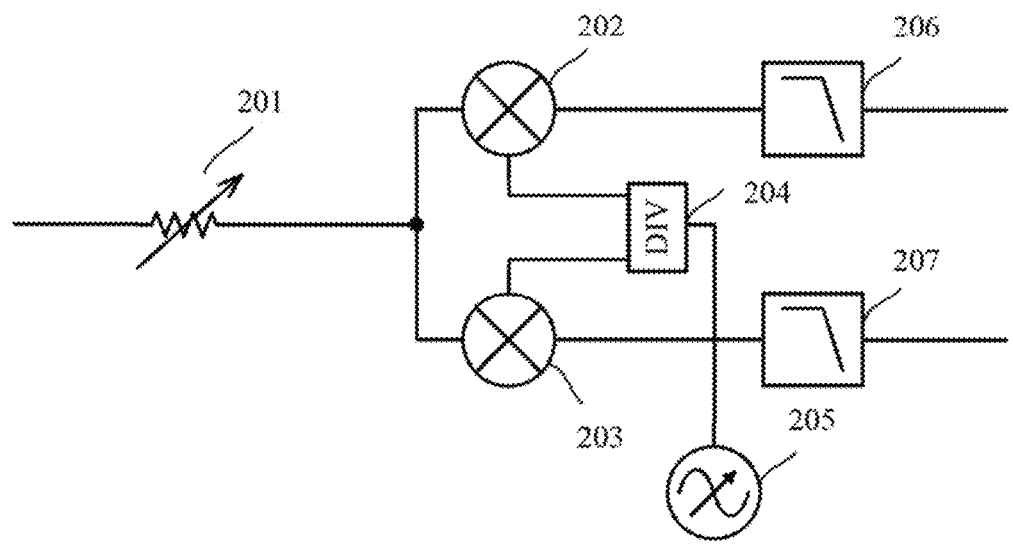
FIG. 2 shows a schematic structural diagram of another receiver according to an embodiment of the present invention.

FIG. 2 shows a schematic diagram of another architecture of the receiver used in a radio frequency module of a base station. The chip includes a radio frequency digital control attenuator 201 (RFDSA), a DEMOD 202, a DEMOD 203, a DIV 204, a PLL 205, an LPF 206, and an LPF 207. A module that includes the DEMOD 202, the DEMOD 203, the DIV 204, the PLL 205, the LPF 206, and the LPF 207 may be referred to as an orthogonal down-frequency converter or an orthogonal down-frequency conversion circuit.

The RFDSA is configured to adjust signal power to facilitate processing by the next circuit. Therefore, when an amplitude of an input signal significantly changes, an amplitude of an output signal can keep constant or change in a relatively small range, so as to prevent the receiver from being overloaded or blocked. The DEMOD 202, the DEMOD 203, the DIV 204, and the PLL 205 in FIG. 2 may be respectively the DEMOD 102, the DEMOD 103, the DIV 104, and the PLL 105 in FIG. 1. The LPF 206 and the LPF 207 in FIG. 2 have no attenuation function.

Both the small cell solution and a massive MIMO solution may use the receiver architecture in FIG. 2. When a small cell solution uses the receiver architecture shown in FIG. 2, there is one LNA outside a chip; temperature compensation, batch compensation, and AGC of a receive link are completed in a radio frequency domain, and frequency compensation is completed in a digital domain. When a massive MIMO solution uses the receiver architecture shown in FIG. 2, there are three LNAs outside the chip; batch compensation, frequency compensation and AGC of the receive link are completed in a radio frequency domain, and temperature compensation is completed in a digital domain.

Figure 3A:
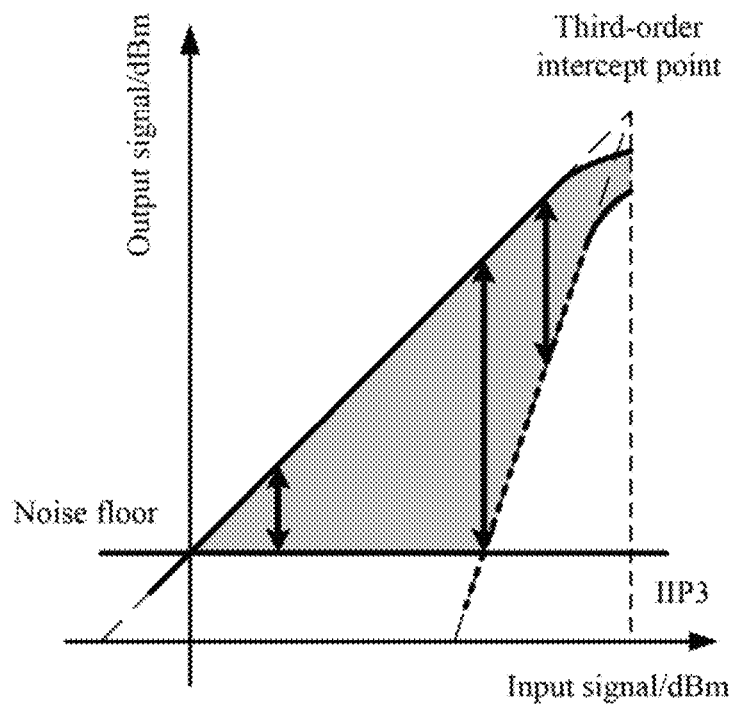
FIG. 3a shows a schematic diagram of an input-output relationship curve of two tone third-order inter-modulation distortion.

When an actual output response and an extension line of a linear part of the actual output response have a difference of 1 dB in output power, input power is an input P1 dB. That is, the P1 dB is a power point at which output only increases by 9 dB when input increases by 10 dB. The P1 dB quantitatively describes a distortion feature of a network when a strong signal is input. Generally, the P1 dB is used as an upper limit of the input. FIG. 3a shows a schematic diagram of an input-output relationship curve of two tone third-order inter-modulation distortion. Curves in an input-output power logarithmic coordinate diagram show a fundamental component and a third harmonic component of a typical frequency response of a weakly nonlinear system. A solid line in FIG. 3a shows a fundamental component of an equi-amplitude two tone signal in a response at an output end of the system. A dashed line is a response curve that illustrates third-order inter-modulation distortion that is generated based on system output as power of the equi-amplitude two tone input signal increases. For a fixed receiver gain setting, a noise floor is a fixed value.

When a weak signal is input, that is, when a power value of a signal is less than P1 dB, output of the fundamental component is a linear response in which a slope is 1, indicating that the output linearly increases by 1 dB correspondingly as the input increases by 1 dB. Likewise, below P1 dB, third-order inter-modulation (IMD3) has a linear input-output relationship, that is, each time the input increases by 1 dB, the output linearly increases by 3 dB, and a slope is 3. In this embodiment of the present invention, the IMD3 may also be referred to a third-order nonlinear component. A point at which extension lines of linear parts of the two response curves intersect is a third-order intercept point, and input power in the third-order intercept point is an input third-order intercept point (IIP3) of a system. A higher input third-order intercept point (that is, a larger value of the third-order intercept point) indicates lower third-order nonlinearity generated by intra-band strong-signal inter-modulation and less effect on a signal-to-interference ratio. However, for a high third-order intercept point and a low noise factor, the receiver has opposite optimization directions. Therefore, when there are requirements for both linearity and a noise factor of the receiver, a compromise needs to be made between the two indicators. In FIG. 3a, a shaded part generated by response curves whose input power is less than the IMD3 and points at which the noise floor and the response curves intersect is a third-order inter-modulation free dynamic range (IMFDR3), that is, a maximum dynamic range when third-order nonlinearity is dominant in an SNDR.

In the receive link, an error vector magnitude (EVM) is used to represent a signal-to-noise ratio of a wanted signal, and correspondingly, a signal to noise distortion ratio (SNDR) is used to represent a contribution of an analog part of the receive link. A calculation method of the SNDR is shown in the following formula:

$$SNDR=P\text{signal}/(N\text{floor}+IMD3) \qquad (1)$$

Psignal represents a wanted signal component that is input, Nfloor represents a noise floor, and IMD3 represents a third-order nonlinear component.

Figure 3B:
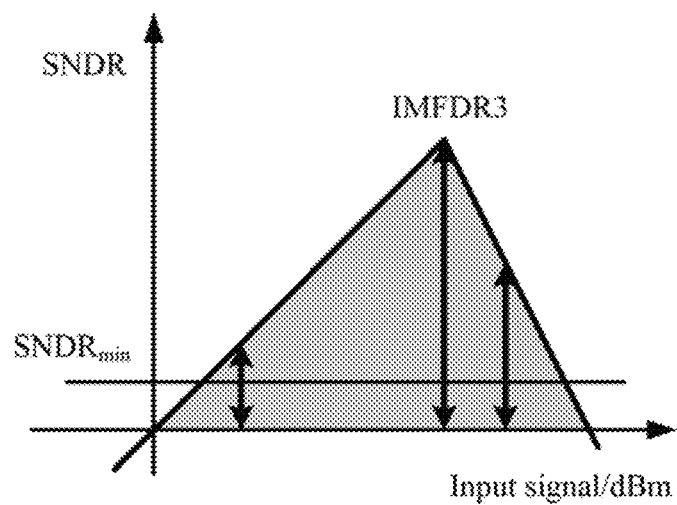
FIG. 3b shows a schematic diagram in which an SNDR changes with an input signal.

FIG. 3b shows a schematic diagram in which an SNDR changes with an input signal. It may be learned from FIG. 3a that, for a fixed receiver gain setting, a noise floor is the fixed value. An $SNDR_{min}$ is a minimum SNDR required by the system when the receiver works. When the SNDR of the receiver is greater than or equal to the $SNDR_{min}$, the receiver can properly receive a signal and process the received signal. When the input signal is relatively weak, the noise floor is dominant in the SNDR. As the signal gradually becomes stronger, the signal-to-noise ratio also gradually increases, and the SNDR linearly increases in the IMFDR3.

Three straight lines in FIG. 3b separately show values of SNDRs corresponding to input signals with different power. In FIG. 3b, the left straight line shows a corresponding SNDR when the input signal is a weak signal, and in this case, the noise floor is dominant. The middle straight line shows an SNDR corresponding to the input signal when values of the noise floor and the nonlinear component are equal. The right straight line shows a corresponding SNDR when the input signal is a strong signal, and in this case, the third-order nonlinear component is dominant. It may be learned that the system generates the third-order nonlinear component as the input signal becomes stronger, and the SNDR begins to decrease when the nonlinear component is equal to the noise floor. In addition, a linear part of a response curve of the third-order nonlinear component has a slope of 3. Therefore, the SNDR begins to decrease at a slope twice as much as that of the input signal.

Figure 3C:
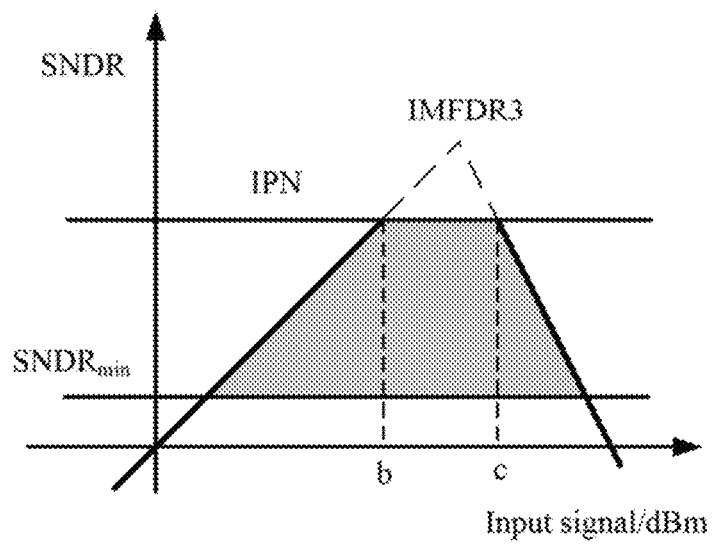
FIG. 3c shows a schematic diagram in which an actual SNDR changes with an input signal.

FIG. 3c shows a schematic diagram in which an actual SNDR changes with an input signal. Because a maximum SNDR is limited by integral phase noise (IPN) of a frequency synthesizer, in a range between b and c shown in the diagram, an SNDR in a curve in which the SNDR changes with the input signal is the IPN of the frequency synthesizer.

Generally, different gain levels are set for a receive channel in a radio frequency amplifier, a radio frequency attenuator, and an intermediate frequency amplifier, and for each fixed gain, there is the change curve shown in FIG. 3c. Therefore, a blank area of the SNDR is compensated for by means of an overlap between different gain levels, thereby extending a dynamic range of the receive channel.

When a small cell solution uses the receiver architecture in FIG. 1, to optimize static sensitivity, one LNA is further disposed outside the chip, so as to avoid an insertion loss from the antenna to an input end of a chip receiver. In this way, there are two LNAs on the receive link. In an application scenario of the small cell, there is a wanted signal or blocker signal of up to −7 dBm. A first LNA (that is, an off-chip LNA) has relatively high linearity and can withstand a strong signal, but an LNA in the chip is overloaded and cannot work properly, so that an SNDR under a strong signal or a strong blocker is low. Therefore, the architecture in FIG. 1 in the application scenario of the small cell achieves better performance only under medium and weak blockers and medium and weak signals. The SNDR under a strong blocker and a strong signal is low, and a dynamic range feature of the SNDR is shown in FIG. 4a.

Figure 4A:
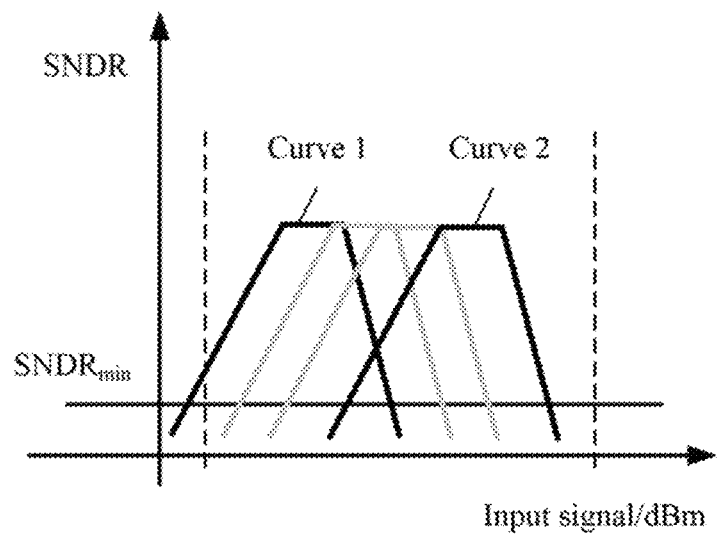
FIG. 4a shows a schematic diagram of a dynamic range of a receiver according to an embodiment of the present invention.

In FIG. 4a, a curve 1 is a curve of an SNDR corresponding to a maximum gain level, a curve 2 is a curve of an SNDR corresponding to a minimum gain level, and multiple curves between the curve 1 and the curve 2 are curves of SNDRs respectively corresponding to multiple gain levels of the receiver. Power of an input signal corresponding to an intersection point of the left line of the curve 1 and a straight line of the $SNDR_{min}$ is minimum receive power in the architecture in FIG. 1. Power of an input signal corresponding to an intersection point of the right line of the curve 2 and the straight line of the $SNDR_{min}$ is maximum receive power in the architecture in FIG. 1. A left dashed line in FIG. 4a is an expected minimum received signal when the receiver is designed, and a right dashed line is an expected maximum received signal when the receiver is designed. It may be learned that the architecture in FIG. 1 meets a requirement for the minimum receive power but cannot meet a requirement for the maximum receive power.

When the small cell uses the chip architecture shown in FIG. 2, no LNA is integrated in the chip, and therefore, the noise floor is relatively high. In this case, static sensitivity of the system is low. However, because an RFDSA is integrated in the chip, linearity under high attenuation is relatively high, and the input third-order intercept point IIP3 is relatively high. Therefore, the SNDR under the strong blocker or the strong signal is high, and the dynamic range feature of the SNDR is shown in FIG. 4b.

Figure 4B:
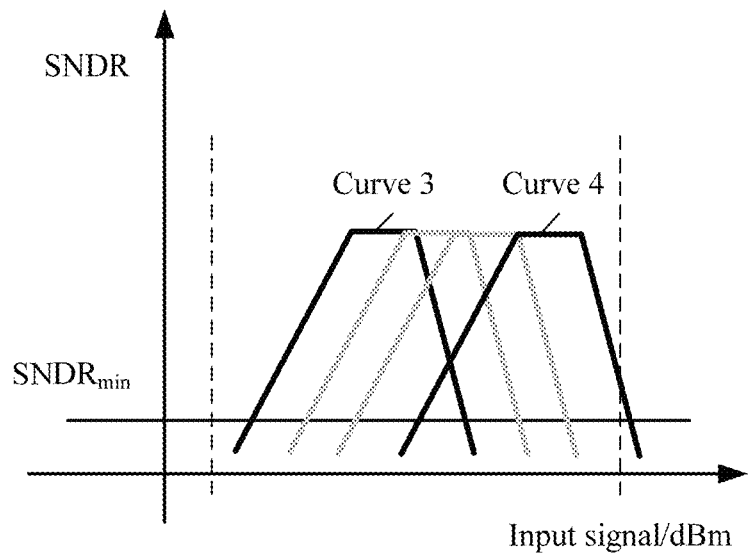
FIG. 4b shows a schematic diagram of a dynamic range of another receiver according to an embodiment of the present invention.

In FIG. 4b, a curve 3 is a curve of an SNDR corresponding to a maximum gain level, a curve 4 is a curve of an SNDR corresponding to a minimum gain level, and multiple curves between the curve 3 and the curve 4 are curves of SNDRs respectively corresponding to multiple gain levels of the receiver. Power of an input signal corresponding to an intersection point of the left line of the curve 3 and a straight line of the $SNDR_{min}$ is minimum receive power in the architecture in FIG. 2. Power of an input signal corresponding to an intersection point of the right line of the curve 4 and the straight line of the $SNDR_{min}$ is maximum receive power in the architecture in FIG. 2. A left dashed line in FIG. 4b is an expected minimum received signal when the receiver is designed, and a right dashed line is an expected maximum received signal when the receiver is designed. It may be learned that the architecture in FIG. 2 meets the requirement for the maximum receive power but cannot meet the requirement for the minimum receive power.

In addition, when a massive MIMO solution uses the chip architecture shown in FIG. 2, no LNA is integrated in the chip. Therefore, to make noise of the system less than a specific noise threshold, in addition to two off-chip LNAs, one additional LNA needs to be disposed outside the chip to suppress the noise. After the two LNAs perform amplification, a third LNA needs to receive a stronger signal. Therefore, a requirement of linearity is high, and high power consumption is required, for example, a discrete amplifier that is made by using high linear silicon germanium (GeSi) process is needed to implement the third LNA, resulting in high costs and high power consumption of the receive link and increased layout and costs of link devices.

Figure 5:
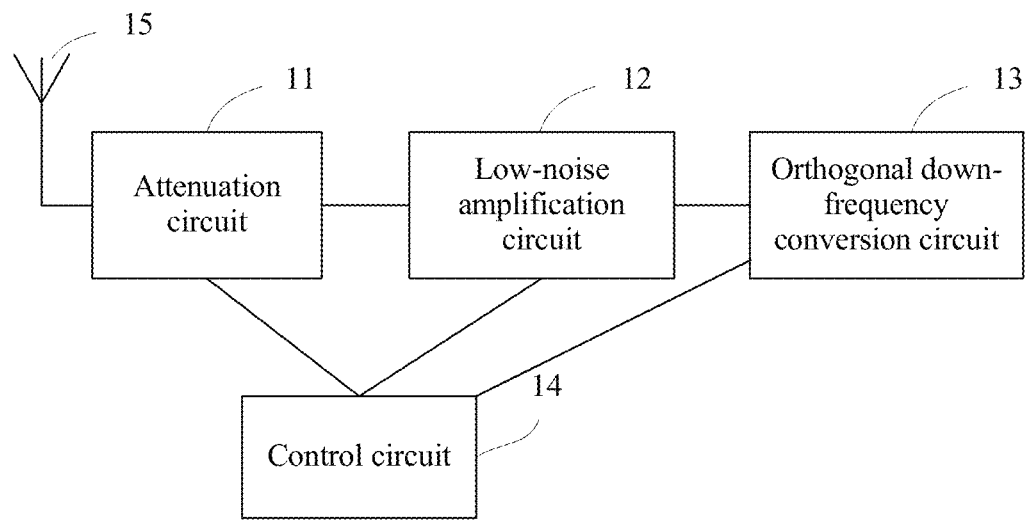
FIG. 5 shows a schematic structural diagram of a receiver according to an embodiment of the present invention.

FIG. 5 shows a schematic structural diagram of a receiver provided in an embodiment of the present invention. The receiver includes an attenuation circuit 11, a low-noise amplification circuit 12, an orthogonal down-frequency conversion circuit 13, and a control circuit 14. An output end of the attenuation circuit 11 is coupled to an input end of the low-noise amplification circuit 12. An output end of the low-noise amplification circuit 12 is coupled to an input end of the orthogonal down-frequency conversion circuit 13. The control circuit 14 is coupled to the low-noise amplification circuit 12 and the attenuation circuit 11. The receiver may be further connected to an antenna 15. The antenna 15 may be configured to receive an input signal and transmit the input signal to the receiver.

The attenuation circuit 11 is configured to receive the input signal, and obtain a first signal according to the input signal, where the first signal is the input signal or an attenuated signal obtained after the input signal is attenuated. The low-noise amplification circuit 12 is configured to receive the first signal, and obtain a second signal according to the first signal, where the second signal is the first signal or an amplified signal obtained after low-noise amplification processing is performed on the first signal. The orthogonal down-frequency conversion circuit 13 is configured to receive the second signal, and process the second signal to obtain an output signal. The control circuit 14 is configured to separately control the attenuation circuit and the low-noise amplification circuit according to power of an interference signal included in the output signal, so as to determine whether the attenuation circuit attenuates the input signal and whether the low-noise amplification circuit amplifies the first signal.

In this embodiment of the present invention, the input signal received by the attenuation circuit may include a blocker signal and a wanted signal, and the blocker signal is an intra-band interference signal. The attenuation circuit 11, the low-noise amplification circuit 12, and the orthogonal down-frequency conversion circuit 13 do not distinguish between the blocker signal and the wanted signal when processing signals that are respectively input to the attenuation circuit 11, the low-noise amplification circuit 12, and the orthogonal down-frequency conversion circuit 13. For the intra-band interference signal, noise reduction is completed in a digital domain. The control circuit may be a control module in the digital domain. The control circuit can distinguish between a wanted signal and a blocker signal in the foregoing output signal, and control the attenuation circuit and the low-noise amplification circuit according to a power value of the blocker signal in the output signal.

Figure 6:
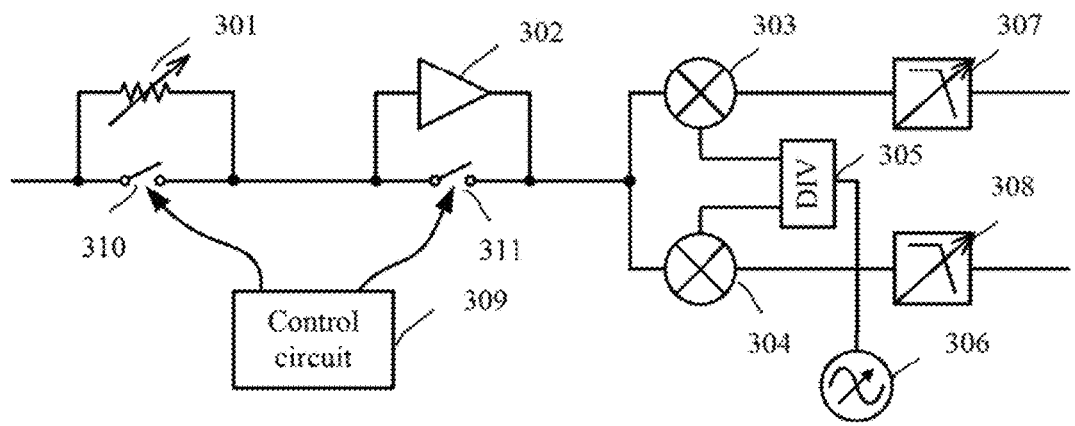
FIG. 6 shows a schematic structural diagram of another receiver according to an embodiment of the present invention.

FIG. 6 shows a schematic structural diagram of a specific receiver according to an embodiment of the present invention. The receiver includes an RFDSA 301, an LNA 302, a DEMOD 303, a DEMOD 304, a DIV 305, a PLL 306, an LPF 307, an LPF 308, a control circuit 309, a first switch 310, and a second switch 311. A device that includes the DEMOD 303, the DEMOD 304, the DIV 305, the PLL 306, the LPF 307, and the LPF 308 may be the orthogonal down-frequency conversion circuit 13 in FIG. 5. The attenuation circuit 11 includes the first switch 310 and the RFDSA 301, and the first switch 310 and the RFDSA 301 are connected in parallel. The low-noise amplification circuit 12 includes the second switch 311 and the LNA 302, and the second switch 311 and the LNA 302 are connected in parallel. The control circuit may control statuses of the two switches according to power of the blocker signal in the input signal. Herein, the blocker signal may also be referred to as an interference signal.

Herein, the first switch 310 and the RFDSA 301 are connected in parallel. The first switch 310 is a bypass switch of the RFDSA 301; that is, one end of the first switch 310 is an input end of the attenuation circuit 11, and the other end is an output end of the attenuation circuit 11. The second switch 311 and the LNA 302 are connected in parallel. The second switch 311 is a bypass switch of the LNA; that is, one end of the second switch 311 is an input end of the low-noise amplification circuit 12, and the other end is an output end of the low-noise amplification circuit 12.

In this embodiment of the present invention, the RFDSA 301 may be the same as the RFDSA 201 in FIG. 2. The DEMOD 303, the DEMOD 304, the DIV 305, the PLL 306, the LPF 307, and the LPF 308 may be respectively the same devices as the DEMOD 102, the DEMOD 103, the DIV 104, the PLL 105, the LPF 106 and the LPF 107 in FIG. 1, or respectively the same devices as the DEMOD 202, the DEMOD 203, the DIV 204, the PLL 205, the LPF 206 and the LPF 207 in FIG. 2. The control circuit 309 may be the control circuit 14 in FIG. 5. The LNA 302 may have a fixed gain.

In this case, the control circuit may control the first switch and the second switch according to the power of the blocker signal, so as to determine whether the attenuation circuit attenuates the input signal and whether the low-noise amplification circuit amplifies the first signal.

Specifically, the control circuit may control the first switch to be closed and the second switch to be opened, where the RFDSA does not attenuate the input signal and the LNA amplifies the first signal when the first switch is closed and the second switch is open; or control the first switch to be opened and the second switch to be opened, where the RFDSA attenuates the input signal and the LNA amplifies the first signal when the first switch is open and the second switch is open; or control the first switch to be opened and the second switch to be closed, where the RFDSA attenuates the input signal and the LNA does not amplify the first signal when the first switch is open and the second switch is closed.

When the first switch is in a closed state, the RFDSA is in a pass-through state, and the input signal is not attenuated by the RFDSA. When the second switch is in an open state, the LNA is connected to a circuit, and in this case, the LNA may directly amplify the input signal. The signal amplified by the LNA may be directly output to the orthogonal down-frequency conversion circuit, and in this case, the receiver works in a first working mode.

When the first switch is in the open state and the second switch is in the open state, both the RFDSA and the LNA are connected to the circuit, the RFDSA attenuates the input signal, and the LNA amplifies the signal output by the RFDSA. The signal amplified by the LNA may be directly output to the orthogonal down-frequency conversion circuit, and in this case, the receiver works in a second working mode.

The first switch in the open state indicates that the RFDSA is connected to the circuit, and the second switch in the closed state indicates that the LNA is in the pass-through state. In this case, the RFDSA attenuates the input signal, and the attenuated signal may be directly input to the orthogonal down-frequency conversion circuit, and in this case, the receiver works in a third working mode.

In this embodiment of the present invention, when power of the blocker signal in the output signal is less than first switching power, it is determined that the receiver works in the first working mode; when the power of the blocker signal in the output signal is greater than or equal to the first switching power and is less than second switching power, it is determined that the receiver works in the second working mode, where the second switching power is greater than the first switching power; or when the power of the blocker signal in the output signal is greater than or equal to the second switching power, it is determined that the receiver works in the third working mode. Herein, the first switching power may be referred to as a first switching point, and the second switching power may be referred to as a second switching point.

In this embodiment of the present invention, the control circuit may determine the first switching power and the second switching power before determining a working mode of the receiver, or the first switching power and the second switching power may be preconfigured in the control circuit.

The control circuit may determine the first switching power and the second switching power according to features of a receiver system under different blocker signals. Specifically, when the blocker signal is weak, the control circuit may set the RFDSA to be in a pass-through state for the receiver, that is, only the LNA amplifies the input signal. In this case, for a receiver architecture shown in FIG. 6, the control circuit may control the first switch to be in the closed state and the second switch to be in the open state.

Figure 7:
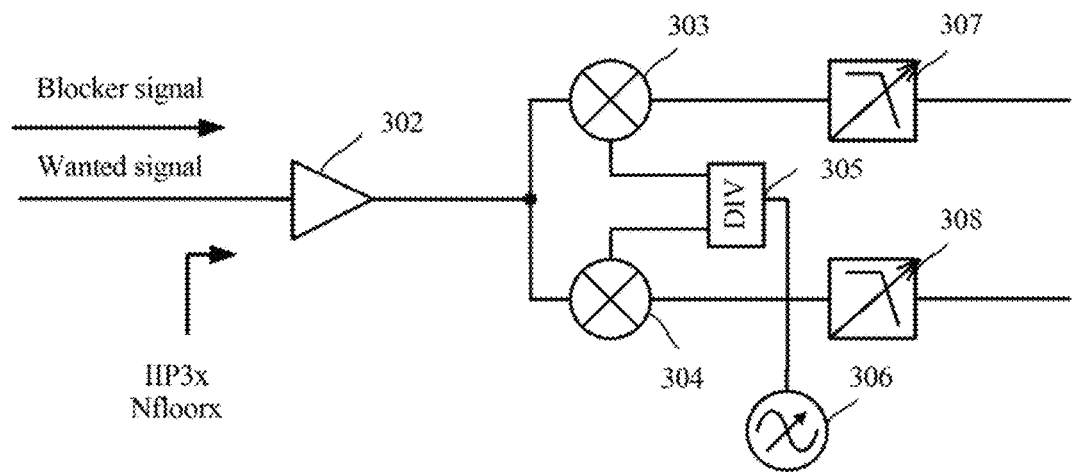
FIG. 7 shows a structural diagram of an equivalent circuit of a receiver according to an embodiment of the present invention.

When only the LNA amplifies the input signal, the receiver architecture in FIG. 6 may be equivalent to a circuit structure shown in FIG. 7, that is, the receiver architecture in FIG. 6 may be equivalent to the receiver architecture in FIG. 1. In FIG. 7, Pblocker is a blocker signal included in an output signal, Psignal is a wanted signal component included in an output signal; IIP3x is an IIP3 obtained after an input third-order intercept point of the LNA (which may be represented as IIP3lna) and an input third-order intercept point of the orthogonal down-frequency conversion circuit (which may be represented as IIP3y) are, after cascade, equivalent to the input end of the LNA. Nfloorx is a noise floor obtained after a noise floor of the LNA (which may be represented as Nfloorlna) and a noise floor of the orthogonal down-frequency conversion circuit (which may be represented as Nfloory) are, after cascade, equivalent to the input end of the LNA.

In this case, that is, in the first working mode, a third-order nonlinear component $IMD3_s$ of the system may be represented as:

$$IMD3_s = 3P\text{blocker} - 2IIP3x \qquad (2)$$

Noise $Nfloor_s$ of the system may be represented as:

$$Nfloor_s = Nfloorx \qquad (3)$$

An SNDR of the system may be represented as:

$$SNDR = P\text{signal} - 10\log(10^{\wedge}((3P\text{blocker} - 2IIP3x)/10) + 10^{\wedge}((Nfloorx)/10)) \qquad (4)$$

It may be understood that in this embodiment of the present invention, IIP3x is a result of the cascade of the IIP3lna of the LNA and the IIP3y of the orthogonal down-frequency conversion circuit. Because of suppression of the gain of the LNA, IIP3y-Gainlna is obtained after IIP3y of the orthogonal down-frequency conversion circuit is equivalent to input of the LNA. IIP3lna of the LNA is far higher than IIP3y-Gainlna obtained after IIP3y of the orthogonal down-frequency conversion circuit is equivalent to the input of the LNA. Therefore, basically, IIP3x=IIP3y-Gainlna, where IIP3y is greater than IIP3x.

The noise Nfloorx is a result of the cascade of Nfloorlna of the LNA and Nfloory of the orthogonal down-frequency conversion circuit. Because of the suppression of the gain of the LNA, Nfloory-Gainlna is obtained after Nfloory of the orthogonal down-frequency conversion circuit is equivalent to the input of the LNA. The noise Nfloorlna of the LNA is far less than a noise floor Nfloory of a demodulator and far greater than Nfloory-Gainlna obtained after Nfloory of the demodulator is equivalent to the input of LNA. Therefore, basically, Nfloorx=Nfloorlna<Nfloory, where Nfloorx is less than Nfloory.

When the blocker signal is relatively weak, for a receive link, it may be that only the LNA amplifies the input signal. Because the RFDSA is in the pass-through state and the LNA is not bypassed, in this case, the link has a maximum gain and a minimum noise factor NF, the third-order nonlinear component IMD3 of the system is less than the noise, and a noise floor of the link is dominant.

When the blocker signal gradually becomes stronger, the IMD3 of the system increases. When the IMD3 of the system is equal to the noise of the system, the control circuit may control the RFDSA to attenuate the input signal, and control the LNA to amplify the signal output by the RFDSA.

Alternatively, when the IMD3 of the system is equal to the noise of the system, a working mode of the receiver is not switched. As the blocker signal becomes stronger, the IMD3 of the system increases, and in this case, the SNDR of the system decreases gradually. When the input signal becomes so strong that the SNDR of the system is equal to an $SNDR_{min}$, the control circuit may control the RFDSA to attenuate the input signal, and control the LNA to amplify the signal output by the RFDSA.

Specifically, the control circuit may control the first switch to switch from the closed state to the open state. In this case, both the first switch and the second switch are in the open state, so as to control the RFDSA to attenuate the input signal, and control the LNA to amplify the signal output by the RFDSA.

It may be understood that power of the blocker signal of the system when the SNDR is equal to the $SNDR_{min}$ is greater than power of the blocker signal when the IMD3 is equal to the noise of the system. Therefore, when the IMD3 is equal to the noise and the first switch switches from the closed state to the open state, a power value of a corresponding blocker signal may be referred to as first earlier switching power, and the first earlier switching power may also be referred to as a first earlier switching point. When the SNDR of the system is equal to the $SNDR_{min}$ and the first switch switches from the closed state to the open state, a power value of a corresponding blocker signal may be referred to as first later switching power, and the first later switching power may also be referred to as a first later switching point. In this embodiment of the present invention, the first switching power may include the first earlier switching power or the first later switching power.

It should be noted that a requirement in a communications protocol is that there are different minimum wanted signals under different blockers, that is, blocker sensitivity. In wireless application, most blockers are in a power range, and generally, the receiver is required to keep a gain as constant as possible in such a power range.

Herein, a maximum blocker signal and power of a corresponding minimum wanted signal in the stable power range are used when the first later switching power is determined. In this embodiment of the present invention, a blocker signal whose power is less than the first switching power may be referred to as a weak blocker signal.

It should be noted that in this embodiment of the present invention, when the control circuit performs switching according to the first later switching power, the following formula needs to be met:

$$P\text{blocker} + Gainlna + Gaindemod + Gainlpf < FSadc - \text{backoff} \qquad (5)$$

Gainlna represents the gain of the LNA, Gaindemod represents a gain of the DEMOD, Gainlpf represents a gain of the LPF, FSadc represents a full scale of an analog-to-digital convener (ADC), backoff is a reduction value, and FSadc and backoff are determined according to a device feature. That is, when the switching is performed, after a blocker is amplified by the LNA, the DEMOD, and the LPF, output power is less than a value obtained after a reliable value backoff is subtracted from the full scale of the ADC.

Figure 8:
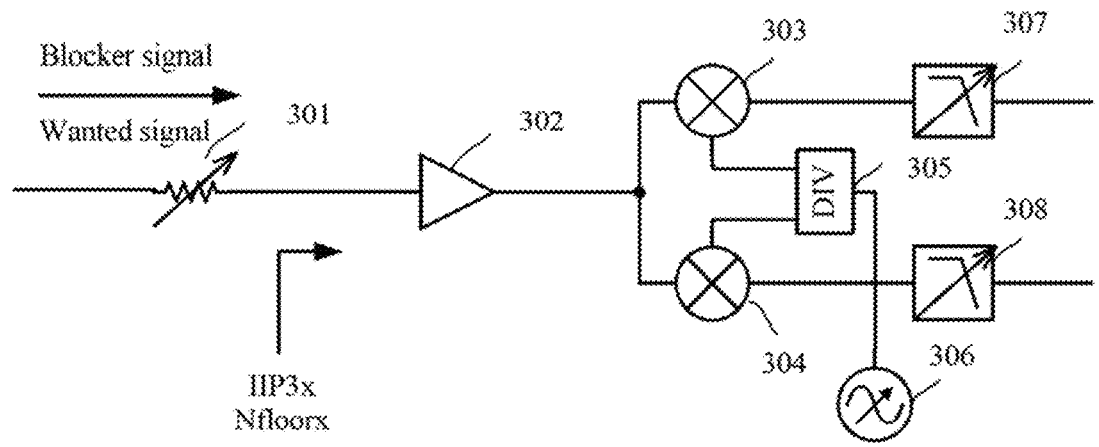
FIG. 8 shows a structural diagram of an equivalent circuit of another receiver according to an embodiment of the present invention.

When the control circuit switches, according to the first switching power, the receiver to a state in which the RFDSA attenuates the input signal and the LNA amplifies the signal output by the RFDSA, the receiver architecture in FIG. 6 may be equivalent to a circuit structure shown in FIG. 8. Pblocker, Psignal, IIP3x, and Nfloorx have the same physical meanings as those of Pblocker, Psignal, IIP3x, and Nfloorx in FIG. 7.

In addition, in FIG. 8, the RFDSA 301 has a variable gain, that is, an attenuation value of the RFDSA 301 (which may be represented as att) is variable. For example, when the control circuit performs the foregoing switching according to the first switching power, the attenuation value of the RFDSA may be 0. For the RFDSA, before the blocker exceeds the first switching power, the gain of the link is stable and remains unchanged; after the blocker exceeds the first switching power, the attenuation value correspondingly increases by 1 dB when the blocker signal increases by 1 dB. In this case, the noise floor increases by 1 dB, and the IMD3 increases by 1 dB.

In this case, that is, in the second working mode, $IMD3_m$ of the system may be represented as:

$$IMD3_m = 3P\text{blocker} - 2IIP3x - 2att \qquad (6)$$

Noise Nfloor$_m$ of the system may be represented as:

$$N\text{floor}_m = N\text{floor}x + att \quad (7)$$

The SNDR of the system may be represented as:

$$SNDR = P\text{signal} - 10\log(10^{((3P\text{blocker}-2IIP3x-2att)/10)} + 10^{(((N\text{floor}x+att)/10))}) \quad (8)$$

After the control circuit performs the foregoing switching according to the first switching power, the attenuation value art of the RFDSA gradually increases as the blocker signal becomes stronger. When the attenuation value of the RFDSA is equal to the gain of the LNA, the first switching power plus the attenuation value of the RFDSA may be selected as the second switching power. In this case, the LNA is bypassed, and the attenuation value of the RFDSA is restored to 0.

Alternatively, after the control circuit performs the foregoing switching according to the second switching power, the SNDR of the system gradually decreases as the IMD3 of the system increases. When the input signal becomes so strong that the SNDR of the system is equal to the SNDR$_{min}$, the control circuit may control only the RFDSA to attenuate the input signal. In this case, a nonlinear component of the RFDSA gradually becomes a main component that affects the SNDR.

Herein, in a method for determining the SNDR, a blocker signal and a corresponding minimum wanted signal under the blocker signal are also used. The blocker signal and the corresponding wanted signal may be given with reference to maximum blocker sensitivity in the protocol.

Specifically, the control circuit may control the second switch to switch from the open state to the closed state. In this case, the first switch is in the open state, and the second switch is in the closed state, so as to control only the RFDSA to attenuate the input signal.

It may be understood that power of the blocker signal of the system when the SNDR is equal to the SNDR$_{min}$ is greater than power of the blocker signal when attenuation value of the RFDSA is equal to the gain value of the LNA. Therefore, when the attenuation value of the RFDSA is equal to the gain value of the LNA and the second switch switches from the open state to the closed state, a power value of a corresponding blocker signal may be referred to as second earlier switching power, and the second earlier switching power may also be referred to as a second earlier switching point. When the SNDR of the system is equal to the SNDR$_{min}$ and the second switch switches from the open state to the closed state, a power value of a corresponding blocker signal may be referred to as second later switching power, and the second later switching power may also be referred to as a second later switching point. In this embodiment of the present invention, the second switching point may include the second earlier switching power or the second later switching power.

In this embodiment of the present invention, a blocker signal whose power is greater than the first switching power and is less than the second switching power may be referred to as a medium blocker signal, and a blocker signal whose power is greater than the second switching power may be referred to as a strong blocker signal.

In this embodiment of the present invention, the first later switching power is delay switching power of the first earlier switching power, and the second later switching power is delay switching power of the second earlier switching power. Delay switching power can ensure that configuration of circuits is the same in a relatively wide input power range. In this way, a circuit feature is relatively stable, and the system does not need to frequently correct a channel. A disadvantage of the delay switching power is that SNDRs corresponding to some input power before the switching are not optimal. However, the SNDRs still meet a requirement of system demodulation.

In this embodiment of the present invention, that the second switch switches from the open state to the closed state may also be understood as that the LNA switches from an amplification state to the pass-through state. In this case, to keep a cascade gain of the system unchanged, the attenuation value of the RFDSA needs to be updated as a difference between the attenuation value of the RFDSA before the switching and the gain value of the LNA before the switching; that is, the gain value of the LNA needs to be subtracted from the attenuation value of the RFDSA. Herein, the attenuation value of the DSA is a value by which the DSA attenuates an input signal, and a gain value of an LNA is a value by which the LNA amplifies a first signal that is input.

For example, when switching is performed at the second earlier switching point, the attenuation value of the RFDSA is equal to the gain value of the LNA. In this case, the RFDSA may be switched to no attenuation, that is, the attenuation value of the RFDSA is switched to 0 dB, and the LNA may be switched to the pass-through state, so as to keep a gain of the system unchanged. For another example, when switching is performed at the second later switching point, the attenuation value of the RFDSA is greater than the gain value of the LNA. In this case, the attenuation value of the RFDSA may be switched to a difference between the attenuation value and the gain value, and the LNA may be switched to the pass-through state, so as to keep the gain of the system unchanged.

It should be noted that when the control circuit performs switching according to the second later switching point, the following formula needs to be met:

$$P\text{blocker} - att + \text{Gain}lna + \text{Gain}demod + \text{Gain}lpf < FSadc - \text{backoff} \quad (9)$$

That is, when the switching is performed in a scenario in which there is a medium blocker or a medium signal, after the blocker is attenuated by the RFDSA and is amplified by the LNA, the DEMOD, and the LPF, output power is less than a value obtained after a reliable value backoff is subtracted from the full scale of the ADC.

Figure 9:
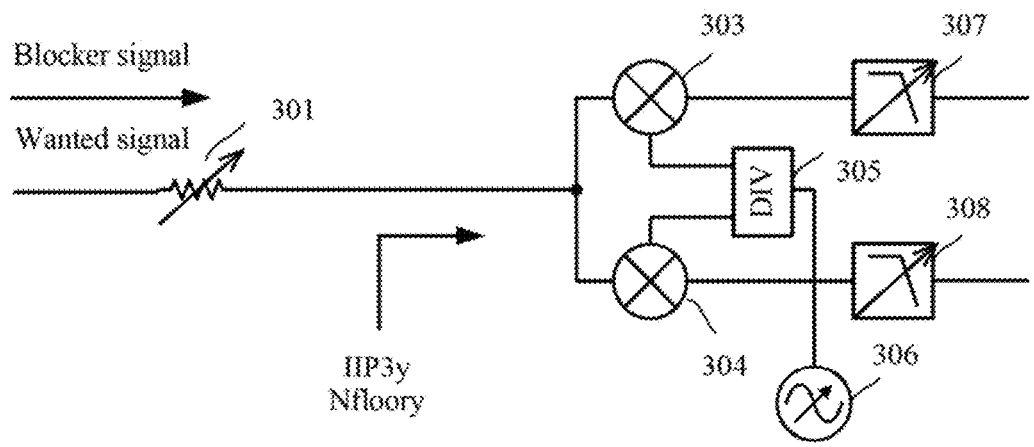
FIG. 9 shows a structural diagram of an equivalent circuit of another receiver according to an embodiment of the present invention.

When the control circuit switches, according to the second switching power, the receiver to a state in which only the RFDSA attenuates the input signal, the receiver architecture in FIG. 6 may be equivalent to a circuit structure shown in FIG. 9; that is, the receiver architecture in FIG. 6 may be equivalent to the receiver architecture in FIG. 2. Pblocker and Psignal have the same physical meanings as those of Pblocker and Psignal in FIG. 7, IIP3y is an IIP3 seen from orthogonal down-frequency conversion circuit input end, Nfloory is a noise floor seen from the orthogonal down-frequency conversion circuit input end, and both IIP3y and Nfloory are fixed values.

In this case, that is, in the third working mode, IMD3$_l$ of the system may be represented as:

$$IMD3_l = 3P\text{blocker} - 2IIP3y - 2att \quad (10)$$

Noise Nfloor$_l$ of the system may be represented as:

$$N\text{floor}_l = N\text{floor}y + att \quad (11)$$

The SNDR of the system may be represented as:

$$SNDR = P\text{signal} - 10\log(10^{((3P\text{blocker}-2IIP3y-2att)/10)} + 10^{(((N\text{floor}y+att)/10))}) \quad (12)$$

In this embodiment of the present invention, blocker signals of different power values correspond to different blocking scenarios, and the control circuit may enable the receiver to work in different working modes according to the different blocking scenarios, so as to meet requirements of the receiver system for noise and linearity in the different scenarios.

Figure 10:
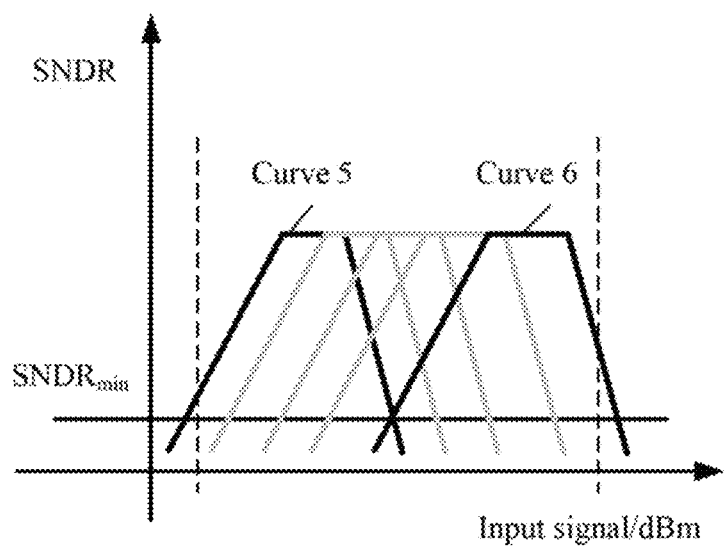
FIG. 10 shows a schematic diagram of a dynamic range of another receiver according to an embodiment of the present invention.

Specifically, when the receiver works in the first working mode, noise of a link may be effectively suppressed to improve static sensitivity. When the receiver works in the second working mode, a better balance is achieved between the noise and the linearity to ensure that an overall SNDR is optimal. When the receiver works in the third working mode, linearity of a receive channel may be further improved to meet a demodulation requirement in an extreme scenario. FIG. 10 shows a dynamic range of the receiver in this embodiment of the present invention.

In FIG. 10, a curve 5 is a curve of an SNDR corresponding to a maximum gain level, a curve 6 is a curve of an SNDR corresponding to a minimum gain level, and multiple curves between the curve 5 and the curve 6 are curves of SNDRs respectively corresponding to multiple gain levels of the receiver. Power of an input signal corresponding to an intersection point of the left line of the curve 5 and a straight line of the $SNDR_{min}$ is minimum receive power in the architecture in FIG. 5 or FIG. 6. Power of an input signal corresponding to an intersection point of the right line of the curve 5 and the straight line of the $SNDR_{min}$ is maximum receive power in the architecture in FIG. 5 or FIG. 6. In FIG. 10, a left dashed line is an expected minimum received signal when the receiver is designed, and a right dashed line is an expected maximum received signal when the receiver is designed. It may be learned that the architecture in FIG. 5 or FIG. 6 may not only meet a requirement for the maximum receive power but also meet a requirement for the minimum receive power.

In addition, when the receiver works in the second working mode, an LNA is disposed behind a DSA. Requirements for the linearity and power consumption of the LNA can be reduced when the noise is optimized, that is, the LNA in the receiver in this embodiment of the present invention does not need to receive an excessively strong signal. Therefore, a requirement for the linearity is low, and low power consumption is required. This facilitates on-chip integration and further reduces layout and costs of link devices.

In a radio frequency circuit, a gain of a circuit at each stage changes with a change in different batches, and the gain of the circuit at each stage also fluctuates with different frequency ranges of different input signals. For the receiver, fixed batch compensation and/or frequency compensation need/needs to be added; that is, a link gain needs to be increased or decreased to compensate for batch fluctuation and/or frequency fluctuation, so as to ensure that gains of different receivers are the same.

In this way, a preattenuation value needs to be set when the receiver gain is set, so as to ensure that preattenuation is released when batch fluctuation and frequency fluctuation cause a relatively low gain. This ensures that gains are the same. In this embodiment of the present invention, attenuating the input signal according to a preset attenuation value is referred to as preattenuation or preattenuation. To perform the batch compensation and the frequency compensation, the receiver shown in FIG. 2 needs an analog channel to perform attenuation. However, there is no attenuation function in an intermediate frequency part, and preattenuation is performed only in the RFDSA. However, in the radio frequency circuit, a quantity of dBs that are preattenuated in the RFDSA is equal to a quantity of dBs by which a noise factor increases. Therefore, preattenuation indicates that input noise in the channel increases, and sensitivity performance under a weak signal or a weak blocker further deteriorates. In addition, due to a sufficient dynamic range that needs to be provided for compensation and a dynamic range required in an AGC, an increased overall dynamic range makes RFDSA design more difficult.

In this embodiment of the present invention, the orthogonal down-frequency conversion circuit includes the low-pass filter LPF, and the control circuit 14 may be coupled to the LPF. The control circuit in the present invention may support two modes: One is to use only intermediate frequency attenuation for the batch compensation and the frequency compensation, and the other is to combine the intermediate frequency attenuation and radio frequency attenuation for use. That is, in this embodiment of the present invention, the control circuit is further configured to: control the LPF to attenuate, according to a preset first attenuation value, a signal that is input to the LPF, or control the LPF to attenuate, according to the first attenuation value, the signal that is input to the LPF, and control the DSA to attenuate the input signal according to a preset second attenuation value. That is, the preattenuation value may be set in an intermediate frequency LPF, or the preattenuation value may be set in both the intermediate frequency LPF and a radio frequency DSA. An attenuation value may be determined according to a device feature. For example, intermediate values of a frequency fluctuation range and a batch fluctuation range may be selected.

When only the intermediate frequency LPF is used for preattenuation, because preattenuation does not need to be performed on the RFDSA, a noise factor NF of circuit input does not significantly increase, so that a noise floor after a system cascade can be less than that in the prior art. In addition, when preattenuation is performed only on the intermediate frequency LPF, there is no need to occupy RFDSA dynamics, so that RFDSA design difficulty can be reduced; further, preattenuation is adjusted only at a circuit manufacturing stage and is not adjusted in use after delivery. Therefore, independent preattenuation is more convenient in a control solution, and is not performed when a used RFDSA performs adjustment.

A gain of the radio frequency circuit also fluctuates with a temperature. Therefore, temperature compensation preattenuation also needs to be performed. The temperature compensation may be performed in a digital domain after the ADC performs sampling, so that neither the radio frequency attenuation nor intermediate frequency attenuation is used. In the radio frequency circuit, the temperature compensation may also be performed in an analog domain. Different from the batch compensation and the frequency compensation, the temperature compensation needs to be performed with the AGC, and in this case, the intermediate frequency attenuation and the radio frequency attenuation may be combined for use.

An embodiment of the present invention further provides a wireless communications apparatus. The wireless communications apparatus includes the foregoing receiver and an antenna, where the antenna is configured to receive the input signal and transmit the input signal to the receiver. The wireless communications apparatus may be an RF circuit in a wireless base station, or may be an RF circuit in a terminal device.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, function units in the embodiments of the present invention may be integrated into one processing unit, or each of the units may exist alone physically, or two or more units are integrated into one unit.

When the functions are implemented in the form of a software function unit and sold or used as an independent product, the functions may be stored in a computer-readable storage medium. Based on such an understanding, the technical solutions of the present invention essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of the present invention. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A receiver comprising:
    an attenuation circuit including an output end and configured to receive an input signal and obtain a first signal according to the input signal, wherein the first signal is the input signal or an attenuated signal obtained after the input signal is attenuated;
    a low-noise amplification circuit including an output end and an input end, the input end coupled to the output end of the attenuation circuit, wherein the low-noise amplification circuit is configured to receive the first signal, and obtain a second signal according to the first signal, wherein the second signal is the first signal or an amplified signal obtained after low-noise amplification processing is performed on the first signal;
    an orthogonal down-frequency conversion circuit including an input end coupled to the output end of the low-noise amplification circuit, wherein the orthogonal down-frequency conversion circuit is configured to receive the second signal, and process the second signal to obtain an output signal; and
    a control circuit separately coupled to the low noise amplification circuit and the attenuation circuit, wherein
    the control circuit is configured to separately control the attenuation circuit and the low-noise amplification circuit so as to determine whether the attenuation circuit attenuates the input signal and whether the low-noise amplification circuit amplifies the first signal, wherein the orthogonal down-frequency conversion circuit comprises a low-pass filter (LPF); the control circuit is coupled to the LPF; and the control circuit is further configured to: control the gain of the LPF according to a preset first attenuation value, or control the gain of the LPF to attenuate according to the first attenuation value and control the attenuation circuit to attenuate the input signal according to a preset second attenuation value.

2. The receiver according to claim 1, wherein the control circuit is configured to:
    when the power of the interference signal is less than preset first switching power, control the attenuation circuit to skip attenuating the input signal, and control the low-noise amplification circuit to amplify the first signal; or
    when the power of the interference signal is greater than or equal to the first switching power and is less than preset second switching power, control the attenuation circuit to attenuate the input signal, and control the low-noise amplification circuit to amplify the first signal, wherein the second switching power is greater than the first switching power; or
    when the power of the interference signal is greater than or equal to the second switching power, control the attenuation circuit to attenuate the input signal, and control the low-noise amplification circuit to skip amplifying the first signal.

3. The receiver according to claim 1, wherein the attenuation circuit comprises a digital control attenuator (DSA) and a first switch that are connected in parallel; the low-noise amplification circuit comprises a low noise amplifier (LNA) and a second switch that are connected in parallel; and the control circuit is configured to control the first switch and the second switch, so as to determine whether the attenuation circuit attenuates the input signal and whether the low-noise amplification circuit amplifies the first signal.

4. The receiver according to claim 3, wherein the control circuit is configured to:
    when the receiver switches from a working mode in which the first switch is open and the second switch is open to a working mode in which the first switch is open and the second switch is closed, update an attenuation value of the DSA to a difference between an attenuation value of the DSA in the working mode in which the first switch is open and the second switch is open and a gain value of the LNA in the working mode in which the first switch is open and the second switch is open.

5. The receiver according to claim 2, wherein the control circuit is further configured to determine the first switching power or the second switching power.

6. A receiver comprising:
an attenuation circuit including an output end and configured to receive an input signal and obtain a first signal according to the input signal, wherein the first signal is the input signal or an attenuated signal obtained after the input signal is attenuated;
a low-noise amplification circuit including an output end and an input end, the input end coupled to the output end of the attenuation circuit, wherein the low-noise amplification circuit is configured to receive the first signal, and obtain a second signal according to the first signal, wherein the second signal is the first signal or an amplified signal obtained after low-noise amplification processing is performed on the first signal;
an orthogonal down-frequency conversion circuit including an input end coupled to the output end of the low-noise amplification circuit, wherein the orthogonal down-frequency conversion circuit is configured to receive the second signal, and process the second signal to obtain an output signal; and
a control circuit separately coupled to the low noise amplification circuit and the attenuation circuit, wherein the control circuit is configured to separately control the attenuation circuit and the low-noise amplification circuit so as to determine whether the attenuation circuit attenuates the input signal and whether the low-noise amplification circuit amplifies the first signal,
wherein the orthogonal down-frequency conversion circuit comprises a low-pass filter (LPF); the control circuit is coupled to the LPF; and the control circuit is further configured to: control the gain of the LPF according to a preset first attenuation value, or control the gain of the LPF to attenuate according to the first attenuation value and control the attenuation circuit to attenuate the input signal according to a preset second attenuation value,
wherein the control circuit is further configured to determine the first switching power or the second switching power, wherein when the attenuation circuit skips attenuating the input signal and the low-noise amplification circuit amplifies the first signal, the control circuit is configured to:
determine a third-order inter-modulation distortion (IMD3) at an input end of the receiver according to the following formula:

$IMD3 = 3Pblocker - 2IIP3x$, wherein

Pblocker represents the interference signal, and IIP3x represents an input third-order intercept point at an input end of the LNA; and
when the IMD3 is equal to noise at the input end of the receiver, use a power value of the interference signal corresponding to the IMD3 as the first switching power.

7. The receiver according to claim 5, wherein when the attenuation circuit skips attenuating the input signal and the low-noise amplification circuit amplifies the first signal, the control circuit is configured to:
determine a first signal to noise distortion ratio (SNDR) of the receiver according to the following formula:

$SNDR = Psignal - 10 \log(10^{((3Pblocker-2IIP3x)/10)} + 10^{((Nfloorx)/10)})$, wherein Psignal represents a wanted signal component comprised in the output signal, Pblocker represents the interference signal, IIP3x represents an input third-order intercept point at an input end of the LNA, and Nfloorx represents a noise floor at the input end of the LNA; and
when the first SNDR is equal to a preset minimum signal to noise distortion ratio ($SNDR_{min}$), use a power value of the interference signal corresponding to the first SNDR as the first switching power.

8. The receiver according to claim 5, wherein when the attenuation circuit attenuates the input signal and the low-noise amplification circuit amplifies the first signal, the control circuit is configured to:
determine a first attenuation value of the DSA according to the gain value of the LNA; and
determine a power value of the interference signal corresponding to the first attenuation value as the second switching power, wherein the attenuation value of the DSA is positively correlated with the power value of the interference signal.

9. The receiver according to claim 5, wherein when the attenuation circuit attenuates the input signal and the low-noise amplification circuit amplifies the first signal, the control circuit is configured to:
determine a second SNDR of the receiver according to the following formula:

$SNDR = Psignal - 10 \log(10^{((3Pblocker-2IIP3x-2att)/10)} + 10^{((Nfloorx+att)/10)})$, wherein
Psignal represents a wanted signal component comprised in the output signal, Pblocker represents the interference signal, IIP3x represents an input third-order intercept point at an input end of the LNA, Nfloorx represents a noise floor at the input end of the LNA, and att represents an attenuation value of the attenuator; and
when the second SNDR is equal to the $SNDR_{min}$, use a power value of the interference signal corresponding to the second SNDR as the second switching power.

10. The receiver according to claim 2, wherein the attenuation circuit comprises a DSA and a first switch that are connected in parallel; the low-noise amplification circuit comprises a LNA and a second switch that are connected in parallel; and the control circuit is configured to control the first switch and the second switch, so as to determine whether the attenuation circuit attenuates the input signal and whether the low-noise amplification circuit amplifies the first signal.

11. The receiver according to claim 10, wherein the control circuit is further configured to determine the first switching power or the second switching power.

12. A wireless communications apparatus, comprising:
an antenna configured to receive the input signal and transmit the input signal; and
a receiver configured to receive the input signal from the antenna and comprising:
an attenuation circuit including an output end and configured to receive an input signal and obtain a first signal according to the input signal, wherein the first signal is the input signal or an attenuated signal obtained after the input signal is attenuated;

a low-noise amplification circuit including an output end and an input end, the input end coupled to the output end of the attenuation circuit, wherein the low-noise amplification circuit is configured to receive the first signal, and obtain a second signal according to the first signal, wherein the second signal is the first signal or an amplified signal obtained after low-noise amplification processing is performed on the first signal;

an orthogonal down-frequency conversion circuit including an input end coupled to the output end of the low-noise amplification circuit, wherein the orthogonal down-frequency conversion circuit is configured to receive the second signal, and process the second signal to obtain an output signal; and a control circuit separately coupled to the low noise amplification circuit and the attenuation circuit, wherein the control circuit is configured to separately control the attenuation circuit and the low-noise amplification circuit according to power of an interference signal comprised in the output signal, so as to determine whether the attenuation circuit attenuates the input signal and whether the low-noise amplification circuit amplifies the first signal, wherein the orthogonal down-frequency conversion circuit comprises a low-pass filter (LPF); the control circuit is coupled to the LPF; and the control circuit is further configured to: control the gain of the LPF according to a preset first attenuation value, or control the or control the gain of the LPF to attenuate according to the first attenuation value and control the attenuation circuit to attenuate the input signal according to a preset second attenuation value.

13. A receiver comprising:

an attenuation circuit including an output end and configured to receive an input signal and obtain a first signal according to the input signal;

a low-noise amplification circuit including an output end and an input end, the input end coupled to the output end of the attenuation circuit, wherein the low-noise amplification circuit is configured to receive the first signal, and obtain a second signal according to the first signal;

an orthogonal down-frequency conversion circuit including an input end coupled to the output end of the low-noise amplification circuit, wherein the orthogonal down-frequency conversion circuit is configured to receive the second signal, and process the second signal to obtain an output signal; and a control circuit separately coupled to the low noise amplification circuit and the attenuation circuit, wherein the control circuit is configured to separately control the attenuation circuit to attenuate or bypass the input signal to obtain the first signal and the low-noise amplification circuit is configured to attenuate or bypass the first signal to obtain the second signal.

14. The receiver according to claim 13, wherein the control circuit is further configured to:

when the power of the interference signal is less than preset first switching power, control the attenuation circuit to skip attenuating the input signal, and control the low-noise amplification circuit to amplify the first signal; or when the power of the interference signal is greater than or equal to the first switching power and is less than preset second switching power, control the attenuation circuit to attenuate the input signal, and control the low-noise amplification circuit to amplify the first signal, wherein the second switching power is greater than the first switching power; or when the power of the interference signal is greater than or equal to the second switching power, control the attenuation circuit to attenuate the input signal, and control the low-noise amplification circuit to skip amplifying the first signal.

15. The receiver according to claim 14, wherein the control circuit is further configured to determine the first switching power or the second switching power.

16. The receiver according to claim 15, wherein when the attenuation circuit skips attenuating the input signal and the low-noise amplification circuit amplifies the first signal, the control circuit is further configured to:

determine a first signal to noise distortion ratio (SNDR) of the receiver according to the following formula:

$$SNDR = P\text{signal} - 10\log(10^{((3P\text{blocker} - 2IIP3x)/10)} + 10^{((N\text{floorx})/10)}), \text{ wherein}$$

Psignal represents a wanted signal component comprised in the output signal, Pblocker represents the interference signal, IIP3x represents an input third-order intercept point at an input end of the LNA, and Nfloorx represents a noise floor at the input end of the LNA; and when the first SNDR is equal to a preset minimum signal to noise distortion ratio ($SNDR_{min}$), use a power value of the interference signal corresponding to the first SNDR as the first switching power.

17. The receiver according to claim 15, wherein when the attenuation circuit attenuates the input signal and the low-noise amplification circuit amplifies the first signal, the control circuit is further configured to:

determine a first attenuation value of the DSA according to the gain value of the LNA; and determine a power value of the interference signal corresponding to the first attenuation value as the second switching power, wherein the attenuation value of the DSA is positively correlated with the power value of the interference signal.

18. The receiver according to claim 15, wherein when the attenuation circuit attenuates the input signal and the low-noise amplification circuit amplifies the first signal, the control circuit is configured to:

determine a second SNDR of the receiver according to the following formula:

$$SNDR = P\text{signal} - 10\log(10^{((3P\text{blocker} - 2IIP3x - 2att)/10)} + 10^{((N\text{floorx} - att)/10)}),$$

wherein

Psignal represents a wanted signal component comprised in the output signal, Pblocker represents the interference signal, IIP3x represents an input third-order intercept point at an input end of the LNA, Nfloorx represents a noise floor at the input end of the LNA, and att represents an attenuation value of the attenuator; and when the second SNDR is equal to the $SNDR_{min}$, use a power value of the interference signal corresponding to the second SNDR as the second switching power.

19. The receiver according to claim 14, wherein the attenuation circuit comprises a DSA and a first switch that are connected in parallel; the low-noise amplification circuit comprises a LNA and a second switch that are connected in parallel; and the control circuit is further configured to control the first switch and the second switch, so as to determine whether the attenuation circuit attenuates the input signal and whether the low-noise amplification circuit amplifies the first signal.

20. The receiver according to claim 19, wherein the control circuit is further configured to determine the first switching power or the second switching power.

21. The receiver according to claim 13, wherein the attenuation circuit comprises a digital control attenuator (DSA) and a first switch that are connected in parallel; the low-noise amplification circuit comprises a low noise amplifier (LNA) and a second switch that are connected in parallel; and the control circuit is further configured to control the first switch and the second switch, so as to determine whether the attenuation circuit attenuates the input signal and whether the low-noise amplification circuit amplifies the first signal.

22. The receiver according to claim 21, wherein the control circuit is further configured to:
when the receiver switches from a working mode in which the first switch is open and the second switch is open to a working mode in which the first switch is open and the second switch is closed, update an attenuation value of the DSA to a difference between an attenuation value of the DSA in the working mode in which the first switch is open and the second switch is open and a gain value of the LNA in the working mode in which the first switch is open and the second switch is open.

* * * * *